United States Patent [19]
Brey et al.

[11] 3,849,231
[45] Nov. 19, 1974

[54] BEAD MECHANISM

[76] Inventors: Wilhelm Brey, Cuyahoga Falls, Ohio; William Hostetler, Santa Ana, Calif.; Earl Ferdnand Loeffler, Akron, Ohio; Hubert Ernest Kolm, Louisville, Ohio; Fred Grove Elder, Atwater, Ohio

[22] Filed: Sept. 15, 1971

[21] Appl. No.: 180,835

Related U.S. Application Data

[62] Division of Ser. No. 10,579, Feb. 11, 1970, Pat. No. 3,700,526.

[52] U.S. Cl.................. 156/403, 156/131, 156/135
[51] Int. Cl........................................... B29h 17/22
[58] Field of Search ........... 156/131, 132, 135, 398, 156/403

[56] References Cited
UNITED STATES PATENTS

| | | | |
|---|---|---|---|
| 1,310,701 | 7/1919 | Hopkinson | 156/403 |
| 1,952,905 | 3/1934 | Bostnick | 156/403 |
| 2,790,481 | 4/1957 | Beckadolph et al. | 156/131 |
| 3,171,796 | 3/1965 | Henley et al. | 156/403 X |
| 3,219,510 | 11/1965 | Frazier | 156/132 X |
| 3,244,575 | 4/1966 | Sabo et al. | 156/403 X |
| 3,310,445 | 3/1967 | Nakane | 156/403 X |
| 3,434,897 | 3/1969 | Caretta et al. | 156/403 |
| 3,438,832 | 4/1969 | Cantaratti | 156/132 X |
| 3,556,900 | 3/1968 | Edney et al. | 156/403 |

*Primary Examiner*—Clifton B. Cosby

EXEMPLARY CLAIM

1. A mechanism for automatically feeding beads, as they are needed, to a machine used in a tire making process for setting beads in position on green tires, said mechanism comprising:
   a. a pair of arms positioned adjacent the machine in predetermined spaced relation to the overall length of a drum with tire making material wrapped thereon;
   b. means for making the arms for rotating in planes angularly disposed to the longitudinal axis of a drum positioned in the machine for receiving beads;
   c. a source of beads disposed adjacent each arm;
   d. a plurality of arcuately spaced fingers carried by each arm for transporting beads from the source to the machine for receipt thereby, the fingers being moveable into and out of engagement with the beads;
   e. means for rotating the arms and fingers into position for grabbing beads from the source;
   f. means for moving the fingers into grabbing engagement with a pair of beads from said source;
   g. means for rotating the arms and fingers with engaged beads, towards the machine for delivery of the beads; and
   h. means for moving the fingers out of engagement with the delivered beads when the machine accepts them;
   i. a shoulder on each finger for engaging beads; and
   j. means carried by the fingers for deflecting beads against the shoulders;
the source of beads including:
   k. at least one stack of beads adjacent each arm;
   l. means for holding the beads in spaced relation in the stacks; and
   m. means for moving the beads towards one end of the stacks for removal therefrom by the fingers.

13 Claims, 9 Drawing Figures

FIG. 1-64 AND 74-97 APPEAR IN U.S. PATENT 3,700,526

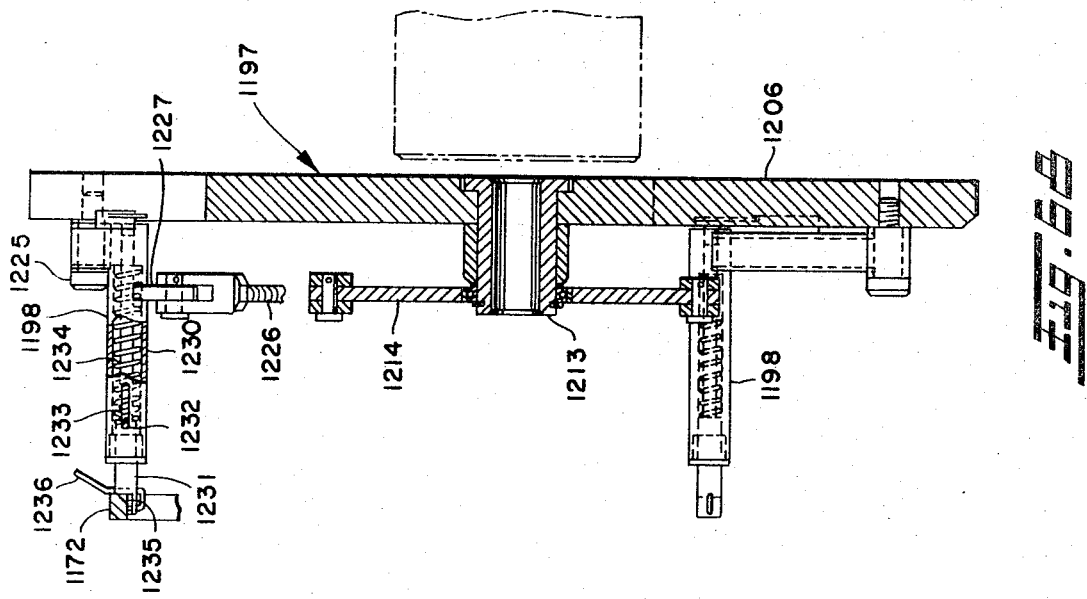

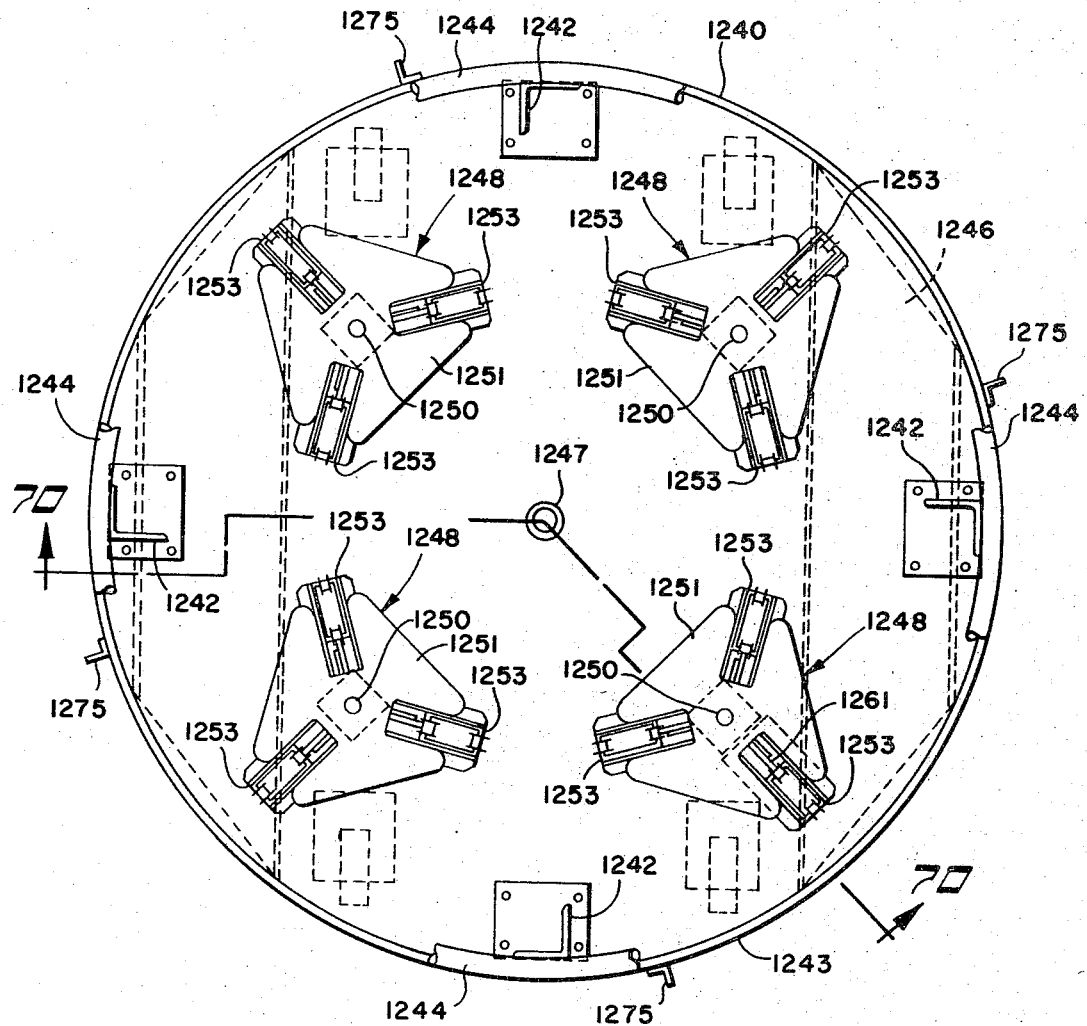
Fig. 6.9

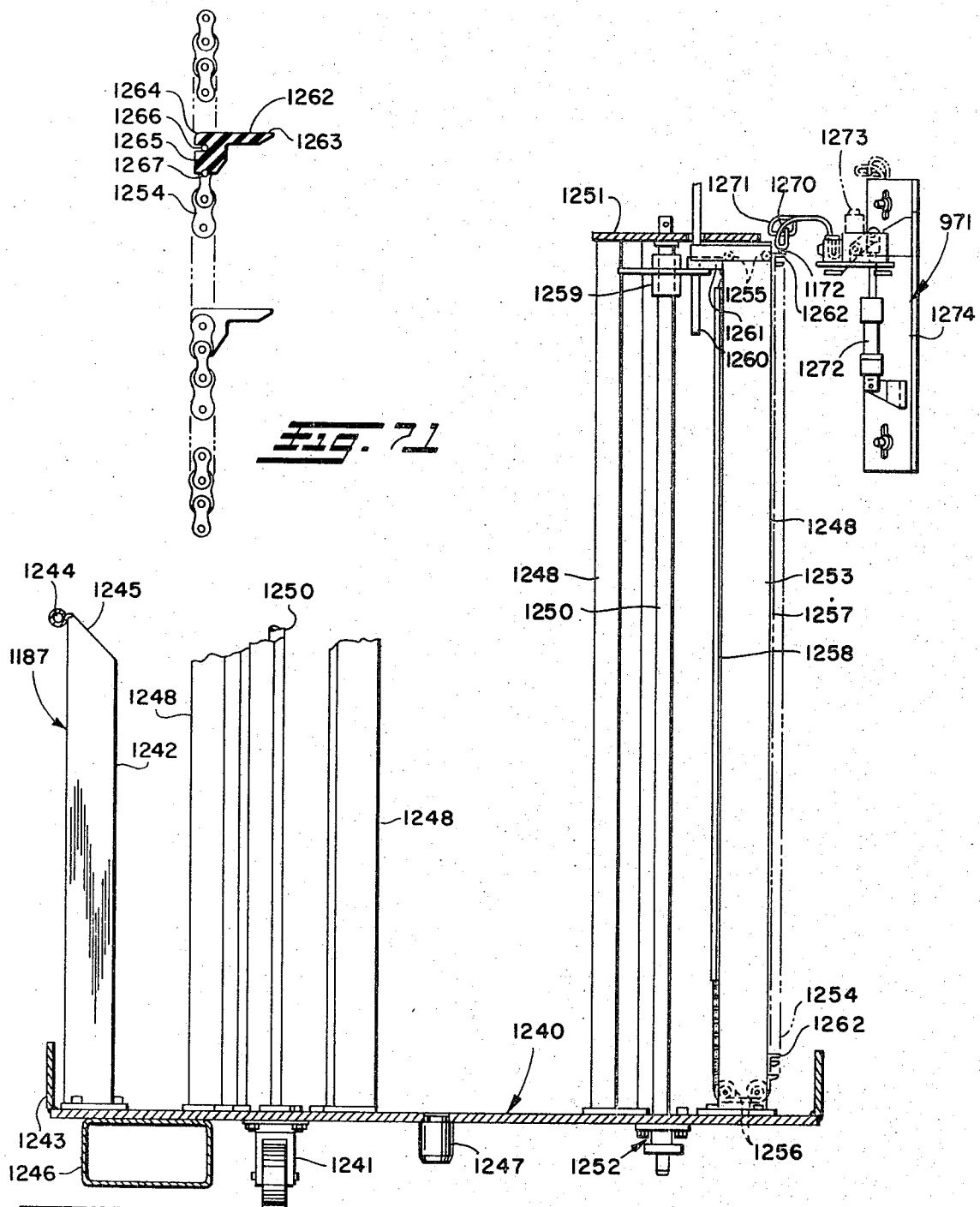

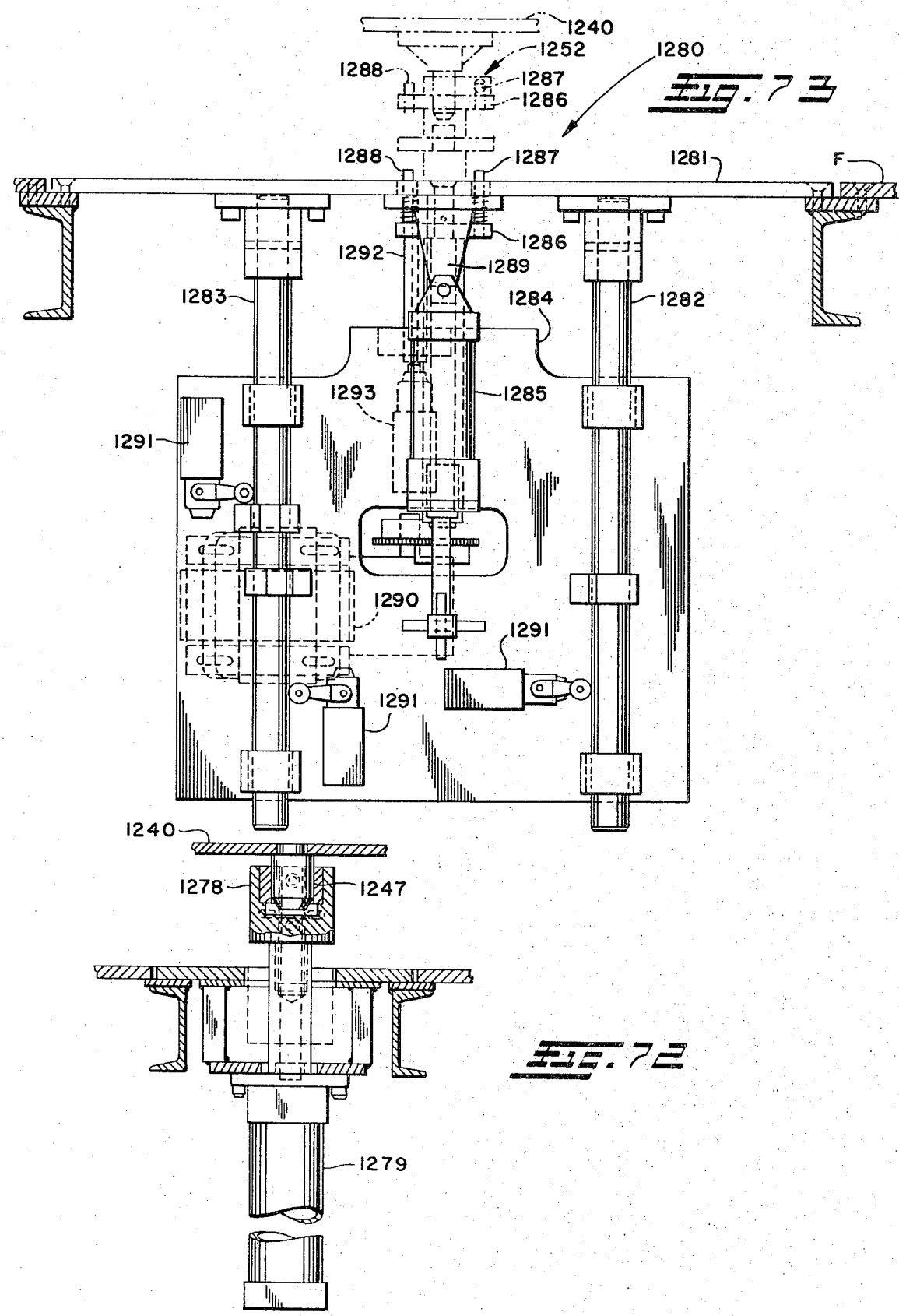

BEAD MECHANISM

This is a division of application Ser. No. 10,579, filed Feb. 11, 1970, now U.S. Pat. No. 3,700,526, the disclosure of which is hereby incorporated herein by reference, and which may be consulted for relation between the several inventive concepts of the continuing divided inventions.

DESCRIPTION OF THE FIGURES OF THE DRAWINGS

The following description of the invention will be better understood by referring to the annexed drawing, wherein:

FIGS. 1-64 and 74-97 appear in U.S. Pat. No. 3,700,526, and are incorporated herein by reference.

FIG. 68 is a section viewed from the line 68—68 of FIG. 67;

FIG. 69 is a plan view of a portable bead storage rack of the bead transfer unit;

FIG. 70 is a section viewed from the line 70—70 of FIG. 69;

FIG. 71 is a cross sectional view of a plastic clip for supporting beads on the bead storage rack;

FIG. 72 is a side section of a mechanism for positioning the bead storage racks; and FIG. 73 is a side section of a mechanism for rotating the bead storage racks.

Bead Transfer Arm

Figure 65:
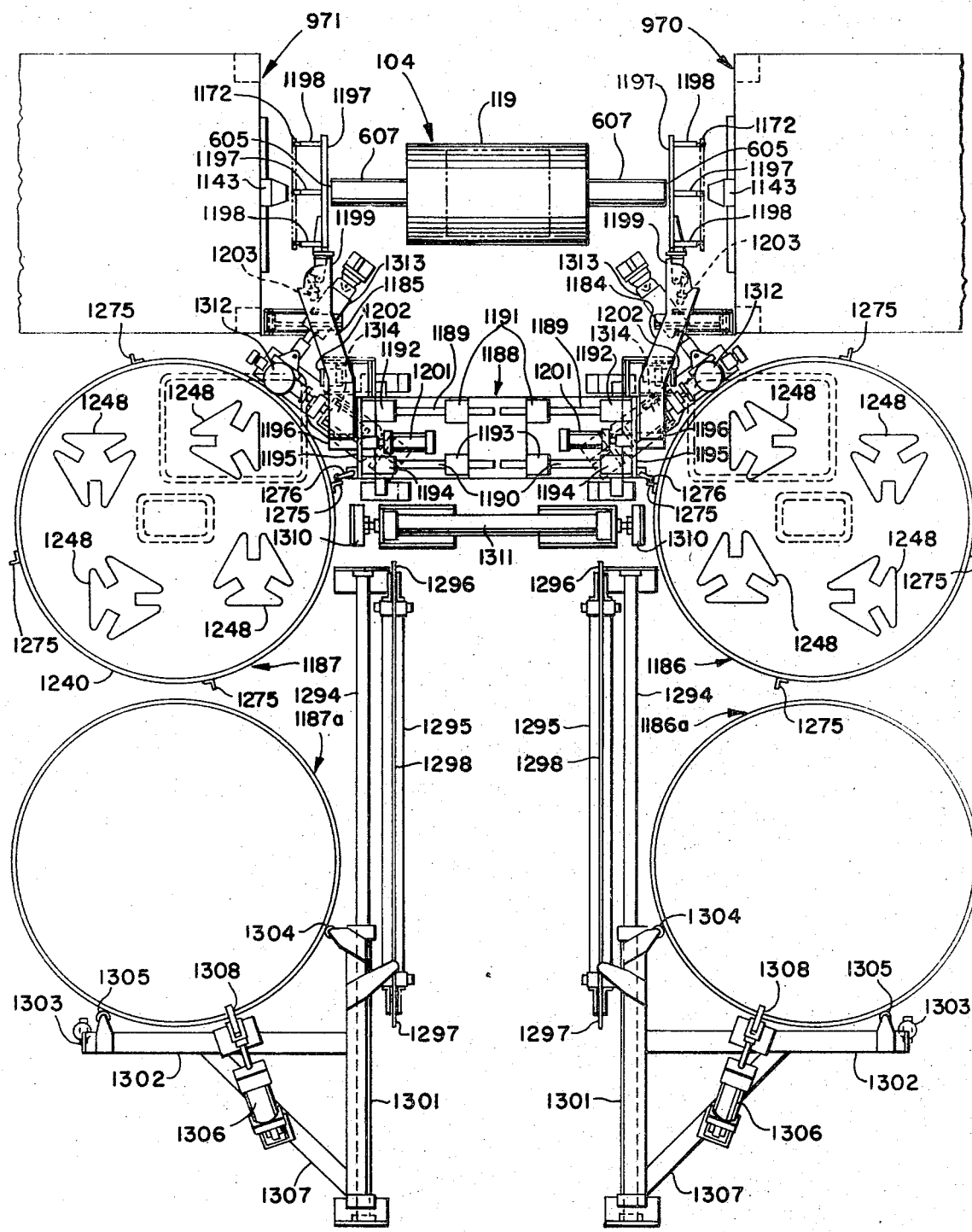
FIG. 65 is a plan view of a unit for transferring beads to the expansible iris.
Figure 66:
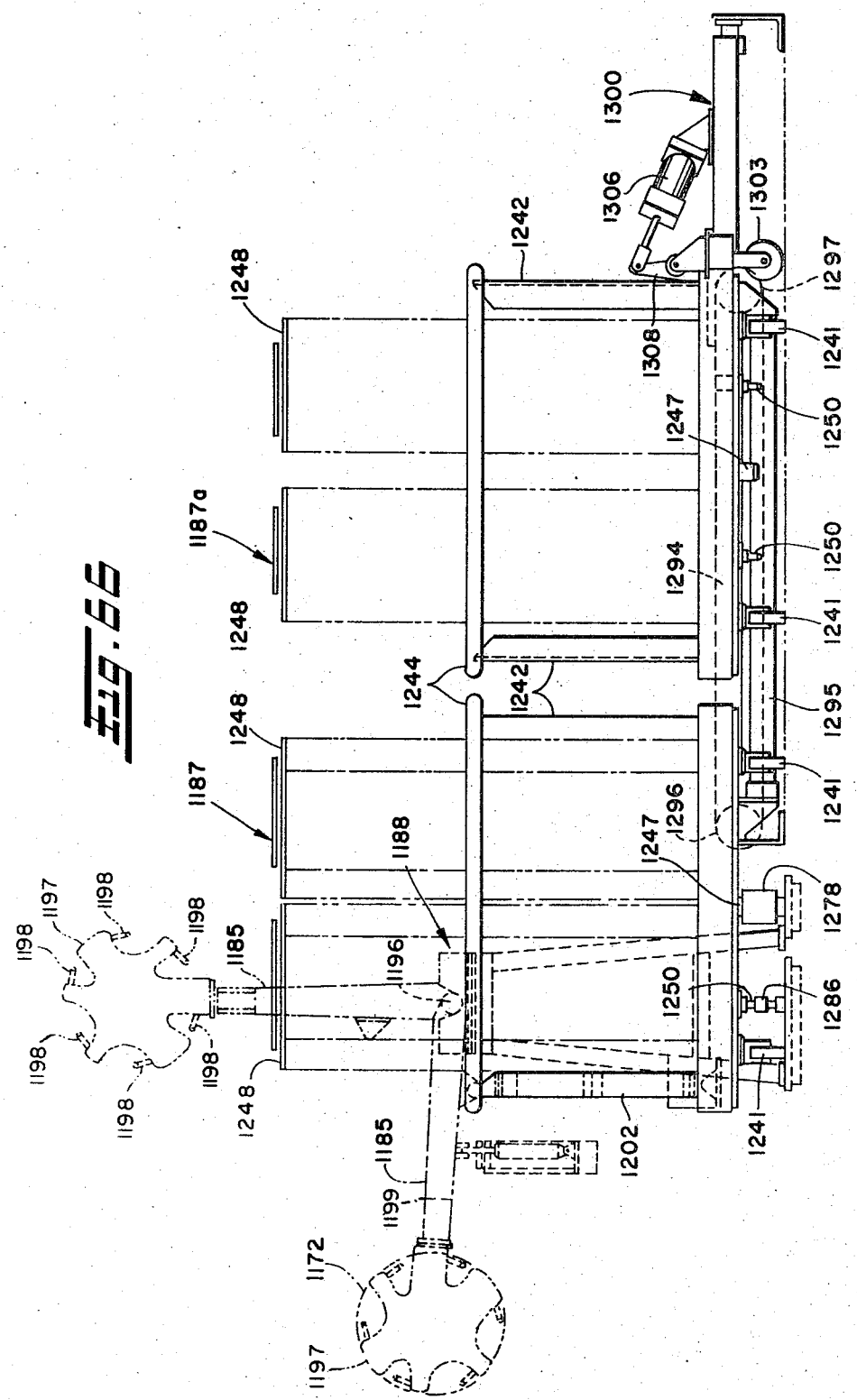
FIG. 66 is a side view of the bead transfer unit.

A pair of similar bead transfer arms 1184 and 1185 (FIGS. 65-66) are provided for taking beads from a couple of portable bead storage racks 1186 and 1187 and moving them into position on the expansible iris 1171 carried by each of the bead setting units 1141 and 1142.

An A-frame 1186 is positioned adjacent the BA unit 104 between the turret frames 970 and 971. Two pairs of guide rods 1189 and 1190 are slidably mounted in parallel relation on pairs of guide brackets 1191 and 1192, and 1193 and 1194 secured in spaced relation to the A-frame 1183. A support plate 1195 is firmly secured to the ends of each pair of guide rods 1189 and 1190 extending beyond the A-frame 1183. A pivot pin 1196 is centrally disposed on each support plate 1195. The bead transfer arms 1184 and 1185 are rotatably mounted on the pivot pins 1196.

A bead transfer hand 1197, including a set of bead grabbing fingers 1198, is rotatably mounted on the free end 1199 of each of the transfer arms 1184 and 1185 for picking up beads from the storage racks 1186 and 1187 and moving them into position adjacent each expansible iris 1171. A pair of air cylinders 1201 are coupled to the support plates 1195 for moving the bead fingers 1198 into close proximity with the outstretched fingers 1173 of each iris 1171, to transfer the beads 1172 from the transfer arms 1184 and 1185 to the adjacent iris 1171 of the bead working units 1141 and 1142.

A pair of elongated air cylinders 1202 are coupled to the bead transfer arms 1184 and 1185 for rotating them to three different arcuate positions. In the first, or bead placing position, each bead hand 1197 is axially aligned with the adjacent expansible iris 1171. In the second, or bead receiving position, each bead hand 1197 is in position for grabbing a bead 1172 from the bead storage racks 1186 and 1187. In the third, or rest position, the bead hands 1197 are arcuately positioned between the first and second positions out of interferring relation with the bead setting mechanism 1140. A smaller air cylinder 1203 is carried by each of the bead transfer arms 1184 and 1185 for operating or rotating the bead hands 1197 to pick up beads from the bead storage racks 1186 and 1187.

Figure 67:
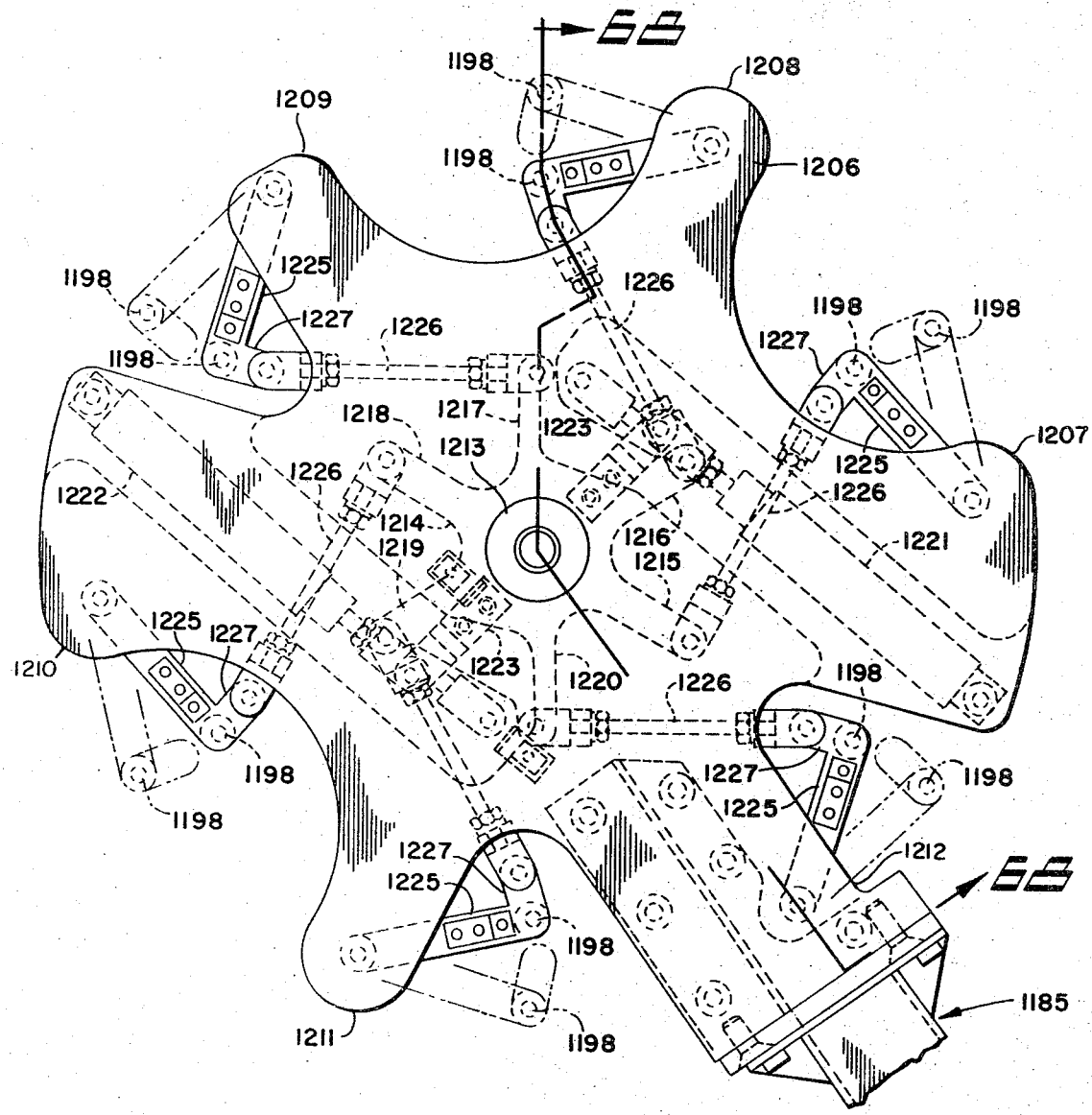
FIG. 67 is a plan view of a bead holding hand of the bead transfer unit.

Each bead hand 1197 (FIGS. 67-68) comprises a flat plate 1206 having a wagon-wheel configuration, including a number of spokes 1207-1212 projecting radially from a hub or pivot pin 1213. A sprocket wheel 1214 with a similar number of projecting sprockets 1215-1220, is rotatably mounted on the hub 1213 in spaced relation from the plate 1206. A pair of air cylinders 1221 and 1222 are coupled to a set of similar pivot arms 1223 fastened to the sprocket wheel 1214, for operating the sprocket wheel 1214 by rotating it about the hub 1213.

The fingers 1198 are each mounted on a link arm 1225, which is rotatably mounted on each of the spokes 1207-1212 adjacent the outer rim of the plate 1206. A cross arm 1226 is rotatably mounted on the tips of each of the sprockets 1215-1220, and coupled by a cross link 1227 to the bead fingers 1198 carried by the spokes 1207-1212. When actuated, the air cylinders 1221 and 1222 (FIG. 67) rotate the sprocket wheel 1214 in a counterclockwise direction, to move the bead fingers 1198 outwardly from the hub 1213 to engage and pick up beads. Conversely, when the air cylinders 1221 and 1222 are retracted, the bead fingers 1198 move to disengage beads.

The bead fingers 1198 each comprise a base portion 1230 and a tip portion 1231 which is slidably mounted on the base portion 1230 by any suitable means, e.g. pin 1232 carried by the tip portion 1231 slidable in slot 1233 formed in the base portion 1230. A coil spring 1234 acts against the tip portion 1231 to bias it outwardly from the base portion 1230. A shoulder 1235 is formed in the tip portion 1231. A configured pin 1236 is carried by the tip portion 1231 for engaging a bead 1172 and deflecting or directing it into seating engagement against the tip shoulder 1235.

Portable Bead Storage Rack

The bead storage racks 1186 and 1187 (FIGS. 69-70) each comprise a platform 1240 mounted on a set of casters 1241. A number of balusters 1242 are arcuately spaced around the outer periphery 1243 of the platform 1240. A circular railing 1244 joins the balusters 1242 together at their upper marginal edges 1245. A pair of similar tubes 1246 are secured on the underside of the platform 1240 adjacent the casters 1241, for receiving the forks of a conventionally designed fork lift truck used to pick up and move the bead storage racks 1186-1187. A centrally disposed pivot pin 1247 extends downward from the platform 1240, and is used for positioning the bead storage racks 1186 and 1187 adjacent the bead transfer arms 1184 and 1185.

A set of four similar bead magazines 1248 are mounted in vertical relation on the platform 1240. The bead magazines 1248 are equally spaced from and about the center pivot pin 1247. The bead frames 1248, each comprise a vertical drive screw 1250 journalled for rotation between the platform 1240 and a top cover plate 1251. A driver 1252 is mounted on the drive screw 1250 below the platform 1240. A set of three tubular frames 1253 are secured between the platform 1240 and cover plate 1251. The tube frames 1253 are equally spaced from and about the drive screw 1250. A link chain 1254 is mounted on the tube frames 1253 for supporting a stack of horizontally disposed beads. The link chains 1254 are each reeved around a pair of head rollers 1255 adjacent the top cover plate 1251 and a pair of bottom rollers 1256 adjacent the platform 1240. The link chains 1254 are movable along opposing sides 1257 and 1258 of each tube frame 1253.

A mover 1259 is threadably mounted on the drive screw 1250, and carries a dowel 1260 for indicating an empty magazine, and a set of lugs 1261 which project into driving engagement with the link chains 1254 mounted on the tube frames 1253.

A number of plastic clips 1262 (FIG. 71) are frictionally mounted on each link chain 1254 for supporting the individual beads in predetermined spaced relation. Each plastic clip 1262 is generally h-shaped, including a supporting lodge 1263 for engaging the beads, and a pair of configured legs 1264 and 1265 which are insertable in adjacent spaces of the link chain 1254 and compressively engage adjacent link pins 1266 and 1267 of the chain 1254.

A pair of wire sensors 1270 and 1271 (FIG. 70) are positioned on the adjacent turret frame 971 for sensing a bead 1172 in the pick-up position. An air cylinder 1272 is provided for rotating the wire sensors 1270 and 1271 out of interfering bead pick-up relation with a properly positioned bead 1172 adjacent the top cover plate 1251. A limit switch 1273 is provided for sensing the arcuate position of the wire sensors 1270 and 1271. The wire sensors 1270 and 1271, air cylinder 1272, and limit switch 1273 are all mounted on a plate 1274 which is vertically adjustable on the turret frame 971.

A set of four projecting angle bars 1275 (FIGS. 65–69), one for each bead magazine 1248, are disposed in predetermined spaced relation around the periphery 1243 of the platform 1240 relative to the arcuate position of the bead magazines 1248, for engaging a limit switch 1276 mounted on the A-frame 1188 to position the stacks of beads for removal by the transfer arms 1184 and 1185.

Storage Bead Rack Positioner and Operator

A pair of similar centering pins in the form of bushings 1278 (FIG. 72) are provided for positioning the bead racks 1186 and 1187 adjacent the bead transfer arms 1184 and 1185. The bushings 1278 are each mounted on an air cylinder 1279 which is disposed in a pit below the floor. The air cylinder 1279 is operated to raise the bushings 1278 into rack centering engagement with the pivot pin 1247 extending below the platform 1240. The pivot pin 1247 and platform 1240 are free to rotate about the axis of the bushing 1278.

A pair of similar mechanisms 1280 (FIG. 73) are provided adjacent the centering bushings 1278, for engaging and rotating the drive screws 1250 of the bead magazines 1248. Each mechanism 1280 is disposed in a pit covered over by a cover plate 1281 with a centrally disposed opening. A pair of guide rods 1282 and 1283 are secured to the cover plate 1281 in vertical, parallel relation. A support 1284 is slidably mounted on the guide rods 1282 and 1283. An air cylinder 1285 connected between the cover plate 1281 and support 1284, is operated to move the support plate 1284 along the guide rods 1282 and 1283 towards the cover plate 1281.

A rotor head 1286 with a plurality of spring biased pins 1287 and 1288, is secured to the end of a drive shaft 1289 which is rotatably mounted on the support 1284. The rotor head 1286 is movable with the support 1284, upwards through the opening in the cover plate 1281 into driving or spinning engagement with the driver 1252 on each drive screw 1250. An electric motor 1290 operates the drive shaft 1289 which, in turn, rotates the drive screw 1250 when the rotor head 1286 is coupled to the driver 1252. A number of limit switches 1291 are positioned for sensing vertical movement of the rotor head 1286, or position of the support 1284 on the guide rods 1282 and 1283.

The dowel 1260 carried by the drive screw mover 1259, engages a sensor pin 1292 adjacent the protruding rotor head 1236 when the bead magazine 1248 is empty. The sensor pin 1292 is moved by the dowel 1260 into contact with an adjacent limit switch 1293, which controls the final shut down of the motor 1290 and air cylinder 1285 and retraction of the rotor head 1286 into the pit below the cover plate 1281, to permit rotation of the platform 1240 for positioning another bead magazine 1248 with a fresh supply of beads.

Provision is made for moving a pair of fully stocked bead racks 1186a and 1187a into position as soon as the stacks of beads carried by the bead racks 1186 and 1187, are deplated. A pair of parallel guide poles 1294 are secured in spaced relation from the floor. A pair of air cylinders 1295 are mounted in parallel relation between the guide poles 1294. A set of guide pulleys 1296 and 1297 are rotatably mounted at the ends of each air cylinder 1295. A set of cables 1298 are reeved around the pairs of guide pulleys 1296 and 1297 and fastened to pistons reciprocable in the air cylinder 1295.

A bushing 1301 is slidably mounted on each guide pole 1294 and carries an outstanding leg 1302 with a caster 1303 at its extended end. A pair of cushion rollers 1304 and 1305 are carried by each bushing 1301 and leg 1302. An air cylinder 1306 is angularly mounted on a cross brace 1307 extending between each bushing 1301 and leg 1302. The air cylinders 1306 are coupled to a set of clamps 1308 for engaging the bead racks 1186a and 1187a and holding them in position against the cushion rollers 1304 and 1305. The bushings 1301 are attached to the cables 1298 for movement along the guide poles 1294 when the air cylinders 1295 are operated.

A couple of rams 1310 extend from a pair of air cylinders 1311 for ejecting the bead racks 1186 and 1187 when the air cylinders 1311 are operated. A drive roller 1312 and operating air cylinder 1313 are mounted on each of the turret frames 970 and 971. An electric motor 1314 is connected to each drive roller 1312 for rotating the bead racks 1186 and 1187 about their pivot pins 1247, when the drive rollers 1312 are moved by the air cylinders 1313 into driving engagement with the platforms 1240.

The wire sensor 1270 mounted on each turret frame 970–971, acts to operate the electric motor 1290 for rotating the drive screw 1250 to move the beads 1172 upwards to the pick-up position. The wire sensor 1270 will continue operating the motor 1290 until it senses a bead, or the dowel 1260 indicates that the magazine 1248 is empty and acts to rotate the platform 1240 as previously described. The wire sensor 1271 acts as an override to sense an improperly positioned bead, and shut down operation of the unit until the bead is removed.

The electric motor 1314 operates each drive roller 1312 to rotate the adjacent bead rack about its pivot pin 1247, until the next projecting angle bar 1275 engages the limit switch 1276 to indicate that the next succeeding bead magazine 1248 is in position. The air cylinder 1285 acts to couple the rotor head 1286 with the driver 1252. The wire sensor 1270 is immediately rotated into position for sensing a bead in the pick-up position. In the case of a fresh stack of beads, the transfer arm will continue operating until the down 1260 reaches bottom and signals the bead magazine 1248 is empty. If the wire sensor 1270 does not sense a bead, it will continue operating the motor 1290 as previously described, until the next bead magazine 1248 is positioned. The sensing mechanisms are programmed to search five bead magazines, after which the air cylinder 1311 is operated to move the ram 1310 for ejecting the empty bead rack.

As soon as the ram 1310 is retracted, the air cylinder 1295 is operated to move the bushing 1301 and clamped alternate bead racks 1186a and 1187a along the guide pole 1294, until the pivot pin 1247 is properly positioned over the centering pin or bushing 1278. The air cylinder 1279 is operated to move the bushing 1278 into coupling engagement with the pivot pin 1247. The air cylinder 1306 is retracted to unclamp the bead rack, after which the air cylinder 1295 is withdrawn to move the bushing 1301 back to its rest position for reloading with another portable bead rack with fresh stacks of beads.

The air cylinder 1313 is operated to move the retracted roller 1312 into engagement with the adjacent platform 1240. The motor 1314 is then operated to rotate the platform 1240 and position a bead magazine 1248, after which the rotor head 1286 is coupled to the driver 1252 for rotating the drive screw 1250, if the wire sensor 1270 indicates that a bead is not in the pick-up position.

The bead transfer arms 1184 and 1185, after they each place a bead on the adjacent iris 1171, move to their second or vertical position. The air cylinder 1203 is operated to rotate the bead hand 1197 over the bead in the pick-up position. The bead fingers 1198 extend inside the positioned bead 1172. The air cylinders 1221 and 1222 are operated to move the fingers 1198 outwardly from the hub 1213 to compressively engage the bead 1172 and retain it against the shoulders 1235 of the finger tip portions 1231. The air cylinder 1203 is retracted to rotate the bead hand 1197 back to its generally vertical position on top of the bead transfer arm. The bead transfer arms 1184 and 1185 are then rotated to their third or rest position until the building drum 119 is removed from Station B and it is clear to place another bead in position on the iris 1171.

What is claimed is:

1. A mechanism for automatically feeding beads, as they are needed, to a machine used in a tire making process for setting beads in position on green tires, said mechanism comprising:

a. a pair of arms positioned adjacent the machine in predetermined spaced relation to the overall length of a drum with tire making material wrapped thereon;
   b. means for mounting the arms for rotating in planes angularly disposed to the longitudinal axis of a drum positioned in the machine for receiving beads;
   c. a source of beads disposed adjacent each arm;
   d. a plurality of arcuately spaced fingers carried by each arm for transporting beads from the source to the machine for receipt thereby, the fingers being movable into and out of engagement with the beads;
   e. means for rotating the arms and fingers into position for grabbing beads from the source;
   f. means for moving the fingers into grabbing engagement with a pair of beads from said source;
   g. means for rotating the arms and fingers with engaged beads, towards the machine for delivery of the beads; and
   h. means for moving the fingers out of engagement with the delivered beads when the machine accepts them;
   i. a shoulder on each finger for engaging beads; and j. means carried by the fingers for deflecting beads against the shoulders;
   the source of beads including:
   k. at least one stack of beads adjacent each arm;
   l. means for holding the beads in spaced relation in the stacks; and
   m. means for moving the beads towards one end of the stacks for removal therefrom by the fingers.

2. The mechanism of claim 1, which includes:
   n. means for positioning the stacks in predetermined relation adjacent the arms;
   o. means for rejecting the stacks from their positions adjacent the arms when the last beads of the stacks are removed; and
   p. means for moving new stacks of beads into position in response to the rejection of depleted stacks.

3. The mechanism of claim 1, which includes:
   n. a platform
   o. means responsive to an empty stack of beads, for rotating the platform to position a new stack of beads, for removal by the fingers;
   p. means responsive to a platform with depleted stacks of beads, for rejecting the platform from its position adjacent the arm; and
   q. means responsive to a platform being rejected for positioning an adjacently disposed platform, with fresh stacks of beads, in said predetermined fixed relation to the adjacent arm.

4. The mechanism of claim 3, wherein the bead holding means (l) includes:
   1. a plurality of arcuately spaced link chains extending between the platform and top of the stacks in continuous, looped relation; and
   2. a plurality of plastic clips removably inserted in the links of the chains in predetermined spaced relation, the clips extending outwardly from the link chains for supporting engagement with beads positioned thereon.

5. The mechanism of claim 4, wherein the bead moving means m includes:

3. a rotatable screw coextensive with the stacks;
4. means responsive to a bead being removed from the top of a stack, for rotating the screw; and
5. means for translating rotary motion of the screw into corresponding axial movement of the chains.

6. The mechanism of claim 5, and means for positioning each stack on the platform, the platform rotating means *o* including:
6. a sensing mechanism positioned below the platform;
7. a pin carried by the screw and movable axially therealong when the screw rotates, the pin engaging the sensing mechanism, after the last bead in a stack is removed;
8. means for rotating the platform when the sensing mechanism is engaged by the pin; and
9. means for stopping rotation of the platform when a new stack of beads is positioned for removal by the fingers.

7. The mechanism of claim 6, wherein the means *p* includes:
10. a ram for engaging the platform; and
11. means for moving the ram axially to engage and push the platform out of position.

8. The mechanism of claim 7, wherein the means *q* includes:
12. a configured frame disposed in a rest position in spaced relation from the ram;
13. means for removably clamping a platform, with stacks of beads, against the frame;
14. means for moving the frame along a fixed pathway to guide the platform into position adjacent the arm; and
15. means for moving the frame out of engagement with the platform and returning the frame to its rest position.

9. A bead storage device used in conjunction with a tire-making machine for automatically setting beads, comprising:
a. a platform mounted on rollers;
b. means for holding a plurality of beads in vertically stacked spaced relation from the platform; and
c. means for moving the beads in a direction away from the platform,
said moving means including
d. a plurality of arcuately spaced continuous link chains extending in looped relation from the platform; and
e. means for causing movement of the link chains.

10. The storage device of claim 9, wherein the holding means *b* includes:
f. a plurality of plastic clips removably inserted in predetermined spaced relation in the links of the chains, the clips extending from the chains for supporting engagement with beads positioned thereon.

11. The storage device of claim 10, wherein the means *e* for causing movement of the beads includes:

g. a rotatable screw disposed between arcuately spaced chains; and
h. means carried by the screw for moving adjacently disposed chains in unison, in response to rotary movement of the screw.

12. The storage device of claim 11, wherein each plastic clip includes:
i. an outstanding ledge for supporting beads;
j. a pair of fingers extending in spaced relation from the ledge and insertable in adjacent spaces of the chain formed by spaced pins and cover plates thereof; and
k. means for holding the fingers in the spaces in compressed engagement with adjacently disposed pins of the chain.

13. The storage device of claim 12, which includes:

l. a plurality of arcuately spaced frames extending from the platform, each frame supporting a plurality of link chains.

* * * * *

PO-1050
(5/69)

UNITED STATES PATENT OFFICE
CERTIFICATE OF CORRECTION

Patent No. 3,849,231            Dated November 19, 1974

Inventor(s) WILHELM BREY, WILLIAM HOSTETLER, EARL FERDNAND LOEFFLER, HUBERT ERNEST KOLM and FRED GROVE ELDER.

It is certified that error appears in the above-identified patent and that said Letters Patent are hereby corrected as shown below:

Column 1, line 47; Delete "1183" - insert instead 1188

Column 4, line 22;    "    "1236 - insert instead 1286

Column 5, line 17; Delete "down" - insert instead dowel

Signed and sealed this 3rd day of June 1975.

(SEAL)
Attest:

RUTH C. MASON
Attesting Officer

C. MARSHALL DANN
Commissioner of Patents
and Trademarks